United States Patent Office 3,528,911
Patented Sept. 15, 1970

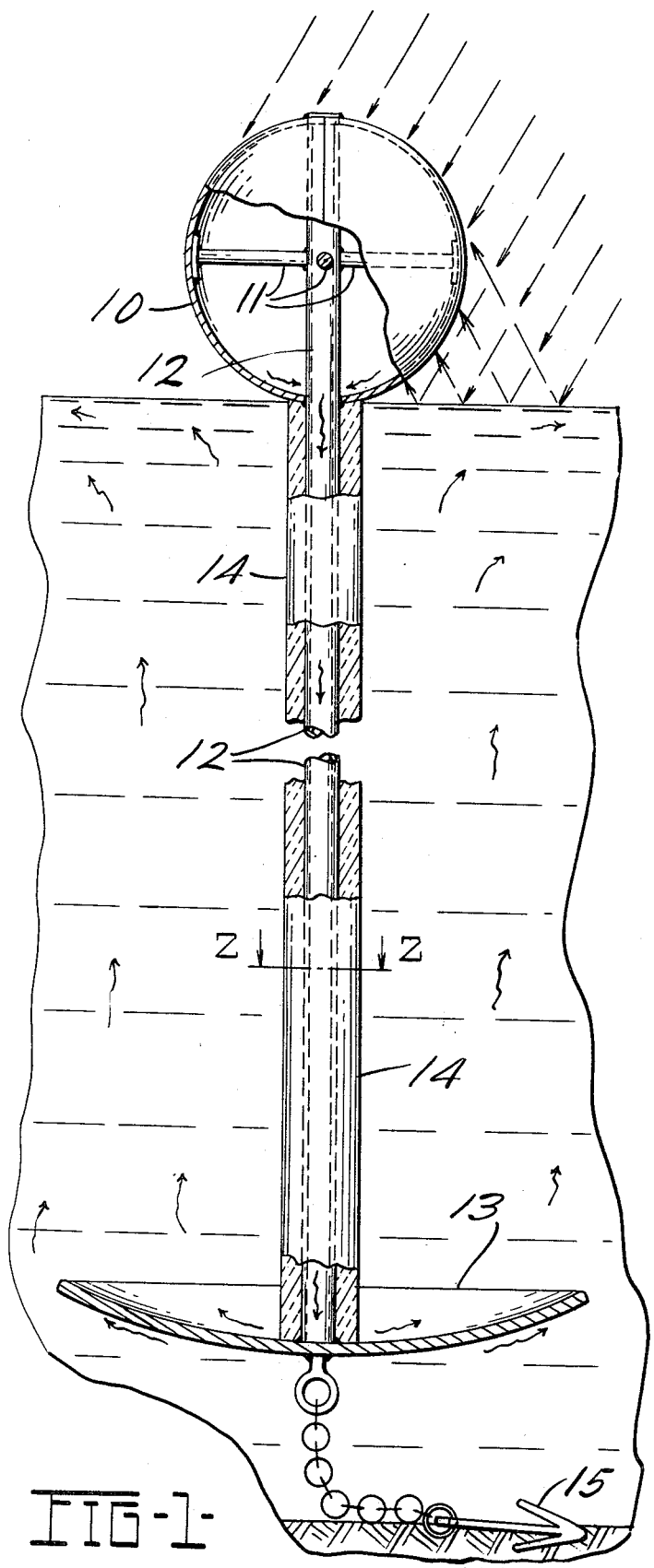
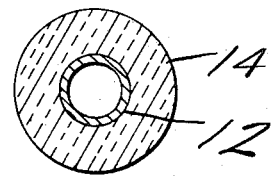
FIG-2-
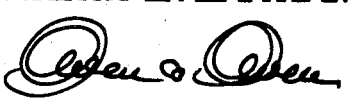

3,528,911
METHOD AND APPARATUS FOR PURIFYING WATER
Urban E. Bowes, 550 E. Front St., Perrysburg, Ohio 43551; Margery W. Bowes, executrix of said Urban E. Bowes, deceased
Filed May 13, 1968, Ser. No. 728,651
Int. Cl. C02b 1/02
U.S. Cl. 210—1                              5 Claims

ABSTRACT OF THE DISCLOSURE

A system to promote purification of water by causing vertical circulation currents to occur which expose water from a lower, colder layer to the action of sun and air. Circulation is brought about by absorbing solar heat in a buoyant body, transferring the absorbed heat to a conductive stem and dissipating the heat into the lower, colder layer of water.

Brief description and background of the invention

This invention relates to a solar operated means to assist in the purification of a body of water such as a pond or lake. Such a body of water tends to stratify according to temperature so that the colder water remains at the bottom. The top of the body of water is exposed to the atmosphere and, by wave action and turbulence will absorb some air so that many pollutants are oxidized and otherwise destroyed. Other pollutants on or very near the surface are destroyed by actinic rays from the sun, but water is virtually opaque to these rays so that their beneficial action is limited to a thin surface layer.

While the surface of a body of water is being quite constantly purified as a result of exposure to sun and air, the bottom layers are not. Thus the bottom layers tend to become more and more polluted to the point where a pond or lake may be incapable of supporting marine life and totally unfit for human use.

The present invention brings about a circulation of water vertically in a pond or lake by creating convection currents therein. Thus the water from a lower level is constantly brought to the top to be subject to purification by exposure to the sun and air.

The apparatus for carrying out the method of the invention comprises means at and above the surface of the water exposed to the sun and capable of absorbing heat therefrom. The solar heated means is connected to a heat radiator disposed well below the surface of the body of water and the connection between the absorber and the radiator is established by an insulated, heat conductive stem. The stem may be flexible or rigid. Solar heat absorbed above the water surface is thus transmitted to the submerged radiator and is passed from the radiator both by radiation and conduction to the adjacent water, heating it to a temperature sufficient to cause a convective flow upwardly to displace water adjacent the surface and to bring new water into position to be acted upon by the air and the sun's actinic rays.

The drawings disclose a preferred form of the apparatus and FIG. 1 is a vertical elevation view, with parts broken away, and FIG. 2 is a section on line 2—2 of FIG. 1.

In the drawings 10 designates a buoyant body, preferably a hollow spherical body, capable of absorbing efficiently the heat from the sun. The surface of the body 10 is blackened and the body itself is made of a highly conductive metal such as aluminum. The spherical heat accumulating body is internally braced by cross members 11, which cross members also act as heat transmitting elements between the surface of the body and a vertical stem 12. The stem 12 thus receives heat by conduction from the surface of the body 10 through its internal structure or by the inclusion of a heat transfer medium within the hollow body.

The stem 12 extends from the heat absorbing body 10 downwardly. At its lower end the stem carries a radiator 13 in the form of a dished plate of highly conductive metal. Thus heat absorbed in the body 10 is transmitted by conduction down the stem 12 to the radiator 13.

To prevent heat loss during the passage of heat from the absorbing body 10 to the radiator 13 the stem is insulated by a tubular mass of insulation 14 extending throughout the length of the stem. This insulation may be semi-rigid and is preferably non-absorbent or is covered with a coating of water impervious material.

The entire system will float in a body of water and may be anchored in place by an anchor indicated diagrammatically at 15.

In operation, heat is absorbed from the rays of the sun by the blackened absorbing body 10, transmitted through the downwardly extending stem 12 and is dissipated in the cold lower strata of the body of water by the radiator 13. The water adjacent the radiator is thus heated and a convective flow is established upwardly as indicated by the arrows in FIG. 1. By this means the lower stratum of water is brought to the surface where it can be acted upon by the actinic rays of the sun and, by wave action and turbulence, aerated, and purified.

It will be obvious that many modifications in the form and disposition of the parts of the invention may be made without departing from the scope of the appended claims.

What I claim is:
1. A method of causing the circulation of a temperature stratified body of water having a warm upper stratum and a colder lower stratum which comprises accumulating solar heat adjacent and above the surface of the water, conducting such accumulated heat down an elongated insulated heat conducting stem which passes through the warm upper stratum to the lower colder stratum, and dissipating the conducted heat into the cold water in the lower stratum to initiate upward convective flow thereof into the warm upper stratum.

2. Apparatus for causing the circulation of a temperature stratified body of water having a warm upper stratum and a colder lower stratum which comprises means for accumulating solar heat adjacent and above the surface of the water, an elongated heat conductive stem for extending from said heat accumulating means through the warm upper stratum to the lower colder stratum, means for thermally insulating said stem from the warm upper stratum, and means to dissipate the conducted heat into the colder water in the lower stratum to initiate upward convective flow thereto into the warm upper stratum.

3. Apparatus in accordance with claim 2 in which said heat accumulating means comprises a buoyant metallic body.

4. Apparatus in accordance with claim 2 in which said heat accumulating means comprises a buoyant metallic hollow sphere having its outer surface blackened to promote heat absorption.

5. Apparatus for causing the circulation of a temperature stratified body of water having a warm upper stratum and a colder lower stratum comprising, in combination, a solar heat absorber, said absorber being buoyant on the surface of the body of water, an elongated heat conducting stem for extending from said body through the warm upper stratum and into the colder lower stratum, said stem having upper and lower ends, means attaching said upper end of said stem to said absorber to pass absorbed heat to said stem, means for thermally insulating said stem from the adjacent water, a heat dissipator, means attaching said dissipator to said lower end of said stem for passing conducted heat from said stem to said dissipator whereby such conducted heat is dissipated to the colder water in the lower stratum to initiate upward convective flow thereof into the warm upper stratum.

References Cited

UNITED STATES PATENTS 2,455,834  12/1948  Ushakoff.

OTHER REFERENCES

Fair, G. M. et al., Water Supply and Waste-Water Disposal, 1954, John Wiley and Sons, New York, pp. 453–461 relied on.

Riddick, T. M., Forced Circulation of Reservoir Waters, vol. 104, June 1957, Water and Sewage Works, pp. 231–237.

MICHAEL E. ROGERS, Primary Examiner

U.S. Cl. X.R.

210—242, 542; 259—1